(12) United States Patent
Phillips

(10) Patent No.: US 7,146,611 B1
(45) Date of Patent: Dec. 5, 2006

(54) METHOD AND SYSTEM FOR MANAGING MEMORY FOR SOFTWARE MODULES

(75) Inventor: Robert Andrew Phillips, Somerville, NJ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 744 days.

(21) Appl. No.: 10/373,403

(22) Filed: Feb. 24, 2003

(51) Int. Cl.
*G06F 9/445* (2006.01)
*G06F 9/44* (2006.01)

(52) U.S. Cl. .................. 717/174; 717/166; 717/175

(58) Field of Classification Search ........ 717/168–171, 717/174–178, 162–163, 166
See application file for complete search history.

(56) References Cited

U.S. PATENT DOCUMENTS

| | | | |
|---|---|---|---|
| 5,715,461 A * | 2/1998 | Yoshitomi | 717/177 |
| 5,970,252 A * | 10/1999 | Buxton et al. | 717/166 |
| 6,093,215 A * | 7/2000 | Buxton et al. | 717/107 |
| 6,195,794 B1 * | 2/2001 | Buxton | 717/108 |
| 6,349,408 B1 * | 2/2002 | Smith | 717/174 |
| 6,470,413 B1 * | 10/2002 | Ogawa | 711/103 |
| 6,490,722 B1 * | 12/2002 | Barton et al. | 717/174 |
| 6,513,153 B1 * | 1/2003 | Lee | 717/100 |
| 6,546,553 B1 * | 4/2003 | Hunt | 717/174 |
| 6,578,199 B1 * | 6/2003 | Tsou et al. | 717/178 |
| 6,658,659 B1 * | 12/2003 | Hiller et al. | 717/170 |
| 6,832,333 B1 * | 12/2004 | Johnson et al. | 714/25 |
| 6,868,448 B1 * | 3/2005 | Gupta et al. | 709/226 |

OTHER PUBLICATIONS

Robertz, "Applying priortizes to memory allocation", ACM ISMM, pp. 1-11, 2002.*
Petersen et al, "A type theory for memory allocation and data layout", AC<POPL, pp. 172-184.*
Nguyen et al, "Memory allocation for embaded system with a compile time unknown scratch pad size", ACM CASES, pp. 115-125, 2005.*
Scales et al, "Towards transparent and efficient software distributed shared memory", ACM SOSP, pp. 157-169, 1997.*

* cited by examiner

*Primary Examiner*—Anil Khatri

(57) ABSTRACT

The invention provides a method and system for managing memory for software modules in a computer processing environment. According to a first aspect of the invention, a method includes allocating memory for a first software module. The method also includes loading the first software module into the allocated memory. The first software module includes processor executable instructions for loading a second software module into memory. The method further includes registering the first software module for service and loading the second software module. According to a second aspect of the invention, a method is provided for releasing memory allocated according to the first aspect of the invention. Systems and articles of manufacture for managing memory for software modules are also described.

31 Claims, 4 Drawing Sheets

METHOD AND SYSTEM FOR MANAGING MEMORY FOR SOFTWARE MODULES

FIELD OF THE INVENTION

The invention relates to the computer processing arts. It finds particular application to a method and system for managing memory for software modules. It will be appreciated that the present invention will find application in any computer processing environment.

BACKGROUND OF THE INVENTION

Dynamically loadable kernel modules ("DLKM's"). DLKM's are executable modules which may be loaded into and unloaded from kernel memory dynamically, without requiring the executing computer to be rebooted. Architectures supporting DLKM's often employ a registration service to manage memory for the supported DLKM's.

Under a typical registration service, invoking a "service-begin" routine in a particular DLKM by calling the device switch table open( ) routine increments a "hold count" associated with the DLKM, and when a "service-end" routine is invoked in the DLKM by calling the device switch table close( ) routine, the associated "hold count" is decremented. As long as the hold count remains positive, the DLKM is considered to be providing a service and should remain resident in memory. When the hold count reaches zero, indicating that there are no longer any calls being serviced, the DLKM may be unloaded from memory.

Under a typical registration service, a "depend count" is associated with a particular DLKM whenever other DLKMs loaded on the system require services provided by the particular DLKM. A DLKM may not be unloaded from memory if its depend count is greater than zero.

In prior environments, only certain types of modules (e.g. DLKM's) may take advantage of the hold count mechanism. For example, only modules of type word and server I/O (WSIO) or STREAMS are authorized to use the hold count service of certain UNIX operating systems. Unauthorized modules must be added to a static kernel, requiring a reboot, or must use a means external to the operating system and environment to ensure that processing is complete before the module may be unloaded from kernel memory.

SUMMARY OF THE INVENTION

The present invention provides a method and system for managing memory allocated to software modules. According to one embodiment of the present invention, a method for reserving memory for software modules is disclosed which includes allocating memory for a first software module. The method also includes loading the first software module into the allocated memory. The first software module includes processor executable instructions for loading a second software module into memory. The method further includes registering the first software module for service, executing the processor executable instructions of the first software module and loading the second software module into memory.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example various embodiments of this method and system.

DETAILED DESCRIPTION OF ILLUSTRATED EMBODIMENT

The present invention may be embodied in a variety of ways. For example, the present invention may be embodied as a programming technique or as an operating system feature. The present invention is a method and/or system that enables a software module to be dynamically loaded even though an operating system kernel would not recognize the software module type as being capable of dynamic loading. The present invention enables dynamic loading of a software module having a type that has not been identified to the operating system. Consequently, the present invention provides a valuable advance that avoids either explicitly rebooting a system to enable the software module to be statically loaded or requiring the software module type to be defined as dynamically loadable and recompiling the operating system.

In one embodiment, the present invention provides a method for reserving memory for a software module. By relying on a first software module that is authorized to use a registration service to cause a second software module to be loaded, the second software module can take advantage of the memory management functions of the registration service even if it is not otherwise authorized to do so.

Figure 1:
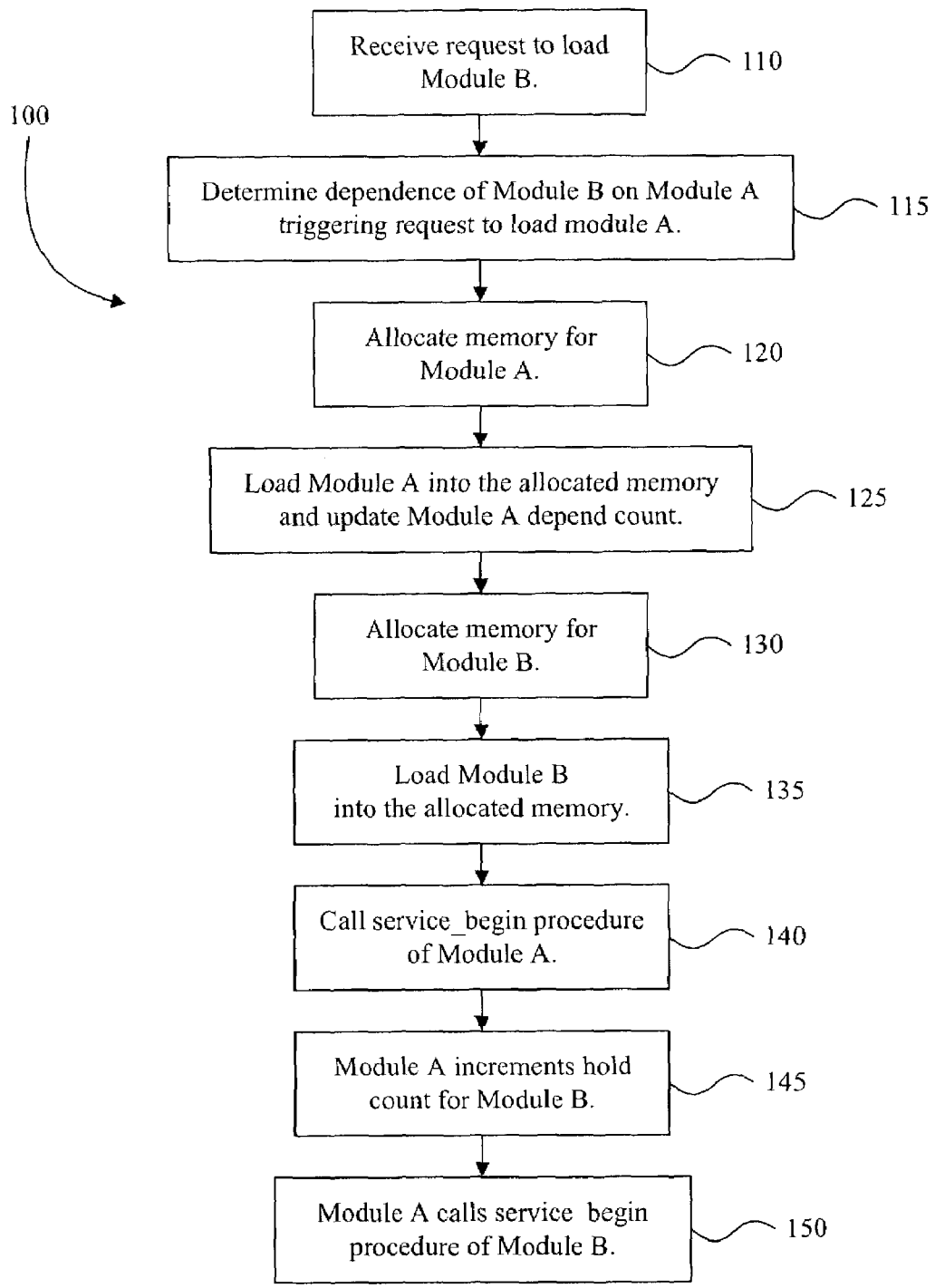
FIG. 1 is an exemplary methodology for reserving memory for a software module in accordance with one embodiment of the present invention.

In FIG. 1 there is exemplary methodology 100 of one embodiment for reserving memory for a software module according to the present invention. As illustrated, the blocks represent functions, actions and/or events performed therein. It will be appreciated that electronic and software applications involve dynamic and flexible processes such that the illustrated blocks can be performed in other sequences different than the one shown. It will also be appreciated by one of ordinary skill in the art that elements embodied as software may be implemented using various programming approaches such as machine language, procedural, object oriented or artificial intelligence techniques. It will further be appreciated that, if desired and appropriate, some or all of the software can be embodied as part of a device's operating system.

According to the methodology, a request is received to load a software module, "Module B", at block 110. The operating system determines that Module B is dependent upon another software module, "Module A", and requests automatic loading of Module A at block 115. Memory is allocated for Module A at block 120, and Module A is loaded into the allocated memory at block 125. In addition, the depend count for Module A is incremented at block 125. Memory is allocated for Module B at block 130, and Module B is loaded into the allocated memory at block 135. The operating system executes a service_begin routine of Module A at block 140 to initialize Module A. Among other things, the service_begin procedure causes a hold count associated with Module B to be incremented at block 145. Module A then calls a service_begin routine of Module B at block 150.

It should be recognized that blocks 110–150 need not be processed in the exact order shown. For example, in one embodiment, memory for Module B may be allocated prior to allocating memory for Module A.

Incrementing the hold count of Module B may be accomplished using any conventional technique. In one embodiment, however, the incrementing of the Module B hold count is accomplished by calling an operating system routine to update a switch table. The switch table stores the value of the hold count. The hold count indicates whether Module B is processing a call and/or should be maintained in memory.

At blocks 130 and 135, the methodology includes allocating memory for and loading Module B into memory. Because the service_begin and service_end procedures of Module A manipulate the hold count of Module B, Module B may benefit from the memory management functions of the switch table, regardless of whether it is authorized to directly manipulate the switch table.

In one embodiment, the methodology includes an additional function of dynamically configuring Module B. This additional step enables Module B to be loaded and executed without requiring a system reboot.

In an alternate embodiment, Module B may be loaded into a second allocated memory that is discrete from the memory allocated for the first software module. In such an alternate embodiment, the first software module should include logic for releasing the second allocated memory, thereby preventing a situation in which the second software module remains in memory indefinitely. In other words, in such an embodiment, the first software module should be responsible for allocating and releasing any memory used by the second software module.

The blocks 110 through 150 substantially describe a procedure for dynamically loading a module that may or may not be recognized by the operating system as being a dynamically loadable module. In such a case, a dynamically loadable kernel module (DLKM) allocates memory for a module that is not recognized as being dynamically loadable. The DLKM is loaded into the memory allocated for the DLKM and the DLKM loads the module that is not recognized as a dynamically loadable type module. Preferably, calls made to the module that is not recognized as a dynamically loadable module are passed through the DLKM. Thus, the module that is not recognized as dynamically loadable is loaded without requiring the system to be rebooted. In addition, the module that is not recognized as a dynamically loadable type module can take advantages of features, such as the switch table, that would not otherwise be available to the module.

Figure 2:
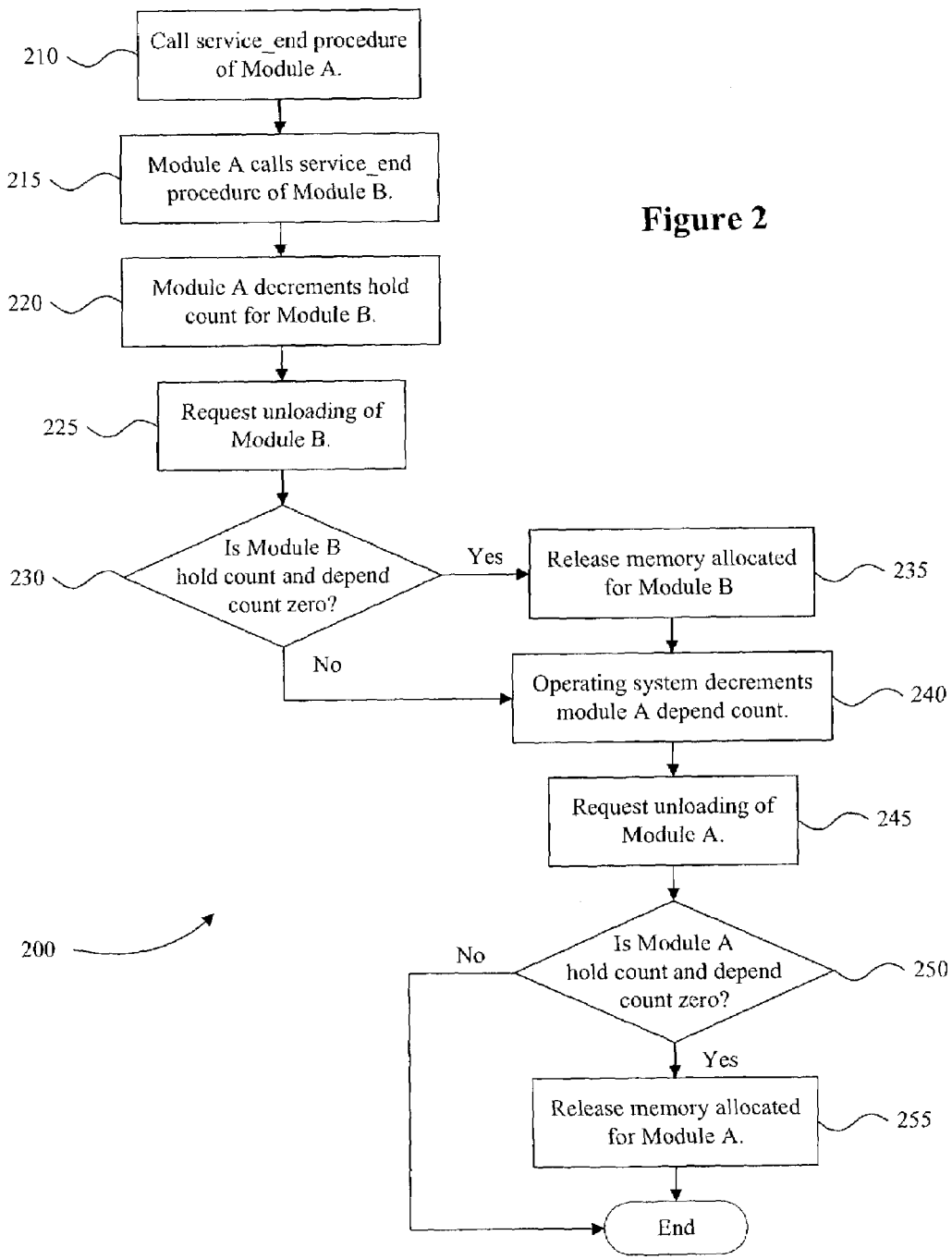
FIG. 2 is an exemplary methodology for releasing memory reserved for a software module in accordance with one embodiment of the present invention.

In FIG. 2, there is exemplary methodology 200 of another embodiment of the present invention for releasing memory reserved for a software module. According to the methodology 200, a processor executes instructions of a service_end procedure of a first software module, Module A, at block 210. The service_end is called when the procedure associated with the module has completed its function. The processor executable instructions direct the processor to call a service_end procedure of a second software module, Module B, at block 215. The service_end procedure of Module A further causes a hold count for Module B to be decremented 220 and requests Module B to be unloaded from memory 225.

Typically, an operating system or other utility software will process the request of block 225. At decision block 230, the operating system directs processing flow based on the value of the hold count and depend count for Module B. If the hold count and depend count for Module B are both zero, the memory allocated for module B is released in block 235. Otherwise, processing flow is directed to block 240. The depend count of module A is decremented in block 240 and a request for unloading module A is generated 245. At blocks 250 and 255, the memory allocated for module A is released if the hold count and depend count of module A are zero.

The blocks 210 through 255 substantially describe a procedure for unloading modules and for releasing memory allocated to the modules. The procedure permits a module that is not recognized as a dynamically loadable type module to take advantages of features, such as the switch table, that are not otherwise be available to the module. The switch table provides a procedure that can be used to prevent a module from being removed from memory before it is safe to remove the software module from memory.

In the illustrated embodiment, module A is responsible for updating the hold count of module B to enable the memory containing module B to be properly managed. In other words, module A ensures that there are no portions of memory, such as the memory allocated for Module B, which remain perpetually reserved after the memory for module A is released. Typically, such an embodiment is used when module A acts as a loader/unloader reserving memory for module B prior to calling it and releasing memory reserved for module B once processing is completed.

It should be understood that Module B can depend on more than one module. For example, Module B can depend on Module A and a Module C. Similarly to the description provided above in reference to FIG. 1, a request is received to load software Module B. A determination is made that Module B depends on both Module A and Module C. Memory is allocated for Module A and for Module C. Module A and Module C are loaded into the allocated memory. Module A and Module C each have a depend count that is incremented. Memory is allocated for Module B, and Module B is loaded into the allocated memory. Just as described above, the operating system executes a service_begin routine of Module A and increments the hold count for Module B. Similarly, the operating system executes a service_begin routine of Module C and increments the hold count for Module B. Module A calls service_begin procedure of Module B, and Module C calls service_begin of procedure of Module B.

In this example, the hold count of Module B has been incremented twice, to reflect the call service_begin procedure of Module A and the call service_begin procedure of Module C. The depend counts for both Module A and Module C have been incremented once.

In reference to FIG. 2, a call service_end procedure of Module A is initiated at block 210. Module A calls a service_end procedure for Module B at block 215. Module A decrements the hold count for Module B at block 220. At block 220 Module A calls a service_end procedure for Module B, and a request to unload Module B is made at block 225. At decision block 230 it is determined that the hold count for Module B is not equal to zero, because the hold count of Module B was incremented by both Module A and Module C. Therefore, the memory allocated to Module B is not released at block 235. Instead block 240 instructs the operating system to decrement the depend count for Module A and block 245 requests the unloading of Module A. At decision block 250, the hold count and the depend count for Module A are equal to zero, so the memory allocated for Module A is released at block 255. For ease of illustration and description, the hold count and depend count are compared to the value of zero, however it is within the spirit and scope of the present invention that any method to keep track of the increments and decrements to the hold count and depend count respectively can be used, such as a any number, symbol, binary number, constant etc. The value zero is used to illustrate that the number of increments is equal to the number of decrements.

The exemplary methodology of FIG. 2 and blocks 210 through 255 is repeated with respect to Module C. A call service_end procedure for Module C is initiated at block 210. Module C initiates a call service_end for the procedure of Module B at block 215. Module C decrements the hold count of Module B at block 220, and requests the unloading of Module B at block 225. At decision block 230 the depend count and hold count of Module B are now equal to zero. As a result, the allocated memory for Module B is released at block 235. The operating system decrements the depend count of Module C at block 240, and requests the unloading of Module C at block 245. At decision block 250 it is determined that the hold count and depend count of Module C are zero, and the allocated memory for Module C is released.

It should be apparent to one skilled in the art that the above methodology is applicable to any number of dependent modules and sub-dependent modules. The allocated memory for the modules can be released when the hold count and the depend count for the module are decremented to zero. This methodology ensures that there are no portions of memory that remain perpetually reserved after the memory for the depended on modules is released. In addition this methodology prevents the allocated memory from being released before it is safe, or when a module is performing a function, or waiting to perform a function.

Figure 3:
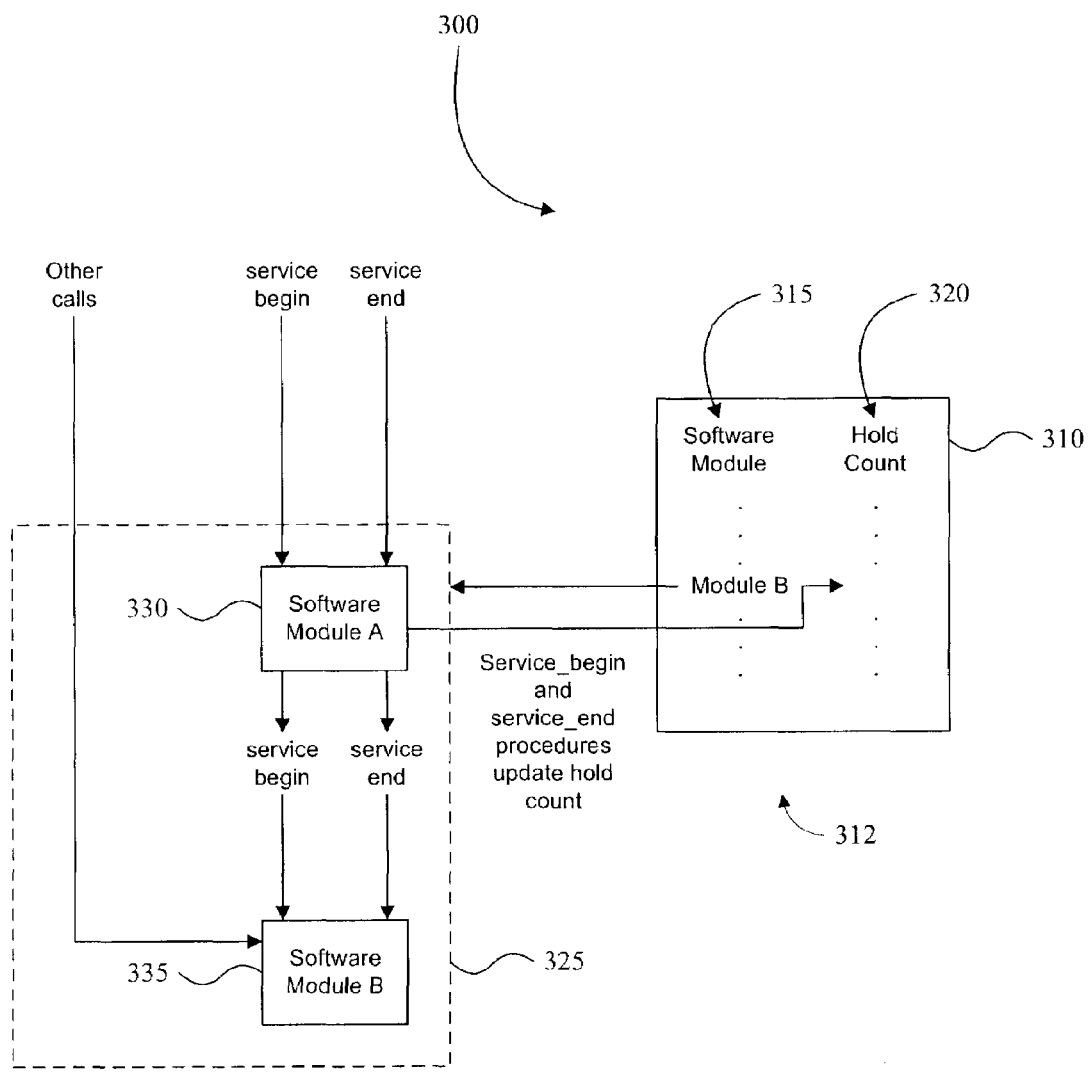
FIG. 3 is a block diagram illustrating an exemplary allocation of memory in accordance with one embodiment of the present invention.

FIG. 3 illustrates an exemplary memory configuration according to one embodiment of the present invention. (Module A changes module B's hold count, and then passes the service-begin and service-end calls through B to the operating system). In the example depicted in FIG. 3, memory 300 includes two memory regions 310 and 325. Memory region 310 stores a switch table that is maintained by an operating system that employs a register/unregister system. The switch table 312 includes software module identifiers 315 and associated hold counts 320. Each software module identifier 315 includes data identifying an associated memory region, such as memory region 325, which contains processor executable instructions of the first software module 330.

In one embodiment, memory region 325 also contains a second memory module 335 which is used by the first software module 330 to perform its function. In such an embodiment, first software module 330 operates primarily as a loader/unloader and is limited to including logic for registering and unregistering itself with the operating system, with other calls to first software module 330 being passed through to the second software module 335 for processing. Although in the embodiment illustrated in FIG. 3 the second software module 335 resides in the memory region 325 allocated for the first software module 330, in other embodiments the second software module 335 may reside in a discrete memory region (not shown) that is controlled by the first software module 330.

Figure 4:
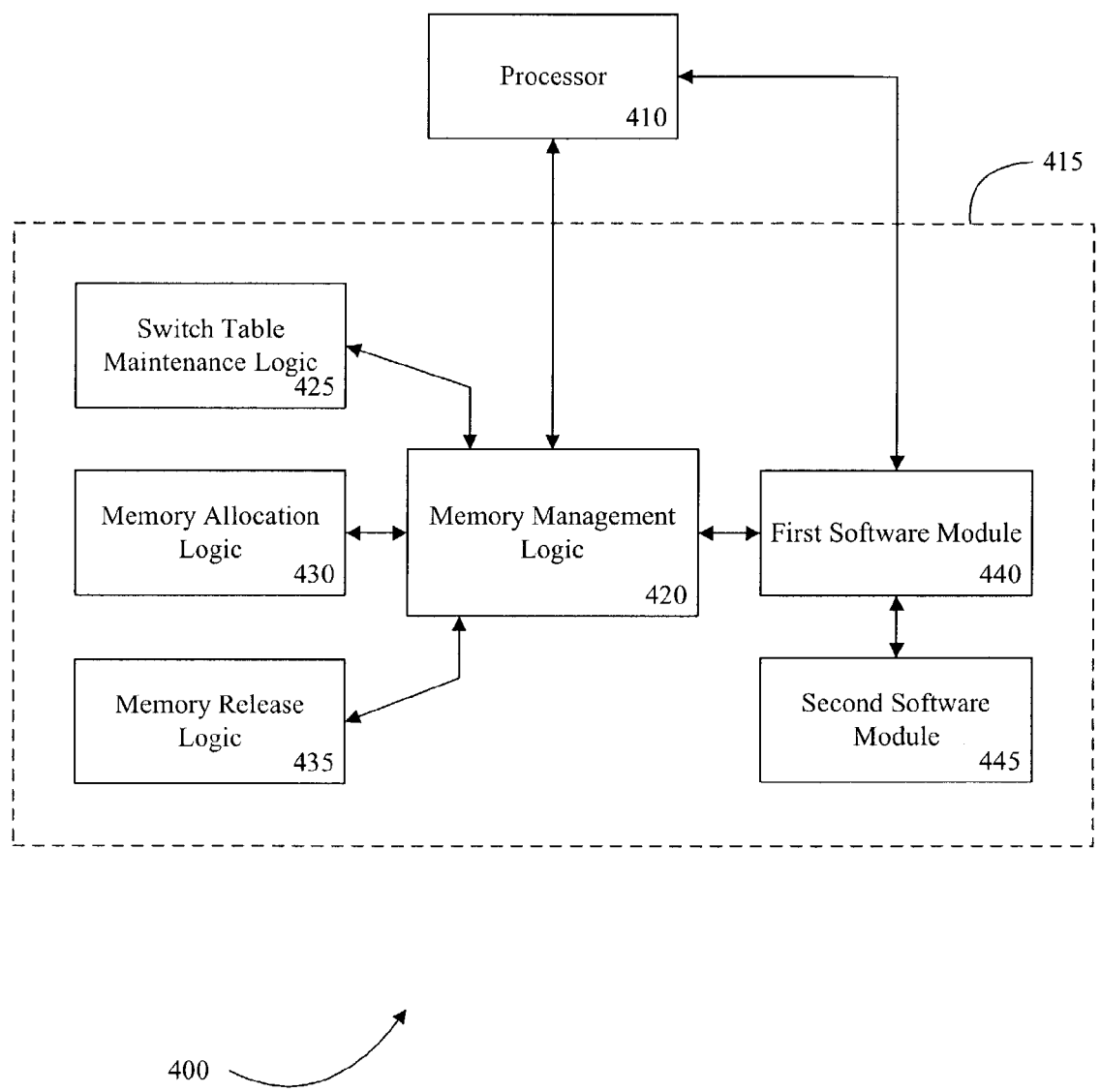
FIG. 4 is a block diagram illustrating an exemplary system for reserving and releasing memory for a software module in accordance with one embodiment of the present invention.

In FIG. 4 there is illustrated an exemplary system 400 for managing memory in accordance with one embodiment of the present invention. As shown, the system includes a processor 410 and a memory 415. The memory 415 is connected to the processor 410 and stores processor executable instructions for managing memory for software modules.

The memory 415 includes memory management logic 420 for controlling the operation of the processor 410 in accordance with the present invention. The memory management logic 420 performs and/or coordinates many of the functions described earlier in reference to FIGS. 1 and 2 The memory management logic 420 employs a switch table maintenance logic 425 to register and unregister supported software modules, such as first software module 440, for example. Preferably, the first software module is a DLKM that may be loaded and executed without rebooting the processor.

In one embodiment, the switch table maintenance logic 425 maintains a hold count associated with each registered software module. A software module is registered after the initiation of a service_begin, and unregistered after the initiation of a service_end. Upon registration of a software module, an associated hold count is incremented, and upon unregistration, the associated hold count is decremented. As long as the software module is registered to process requests, i.e. has executed at least one more service_begin request than service_end request, the hold count will have a positive value. Once the hold count is decremented to zero, the software module may be removed from memory. A hold count value of zero indicates that the software module is no longer processing a request and no longer available to process further requests.

The memory management logic 420 uses memory allocation logic 430 to allocate memory for the fist software module 440, and to load the first software module 440 into memory. The memory management logic 420 determines that the first software module 440 is dependent on a second software module 445, and uses the memory allocation logic 430 to allocate memory for the second software module 445.

Once the memory management logic has registered and loaded the first software module 440, the first software module 440 directs the processor to load second software module 445. The first software module 440 utilizes the second software module 445 to respond to requests for processing. Upon a call service_begin procedure to the second software module 445, the memory management logic 420 increments a hold count for the first software module 440 and stores it in the switch table maintenance logic 425, as described above. This prevents the first software module 440 from being removed from memory and/or releasing the memory allocated to the second software module 445 while the second software module 445 is performing a task. The first software module 440 acts as a loader and unloader for the second software module 445, and the vast majority if not all of the request processing is passed through the first software module 440 to the second software module 445. In this way, the second software module is able to reap the benefits of the switch table maintenance module 425, regardless of whether the module type of the second software module is supported.

Upon completion of its task, the second software module 445 executes a call service_end procedure. The second software module 445 further initiates a call service_end procedure for the first software module 440. The memory management logic 420 decrements the first software module 440 hold count that is stored in the switch table maintenance logic 425. The memory management logic 420 determines if the hold count on the first software module 440 is zero, and if so the memory management logic 420 uses memory release logic 435 to unload the first software module 440 and/or release the memory allocated to the first software module 440. The memory management logic 420 further determines whether the hold count for the second module 445 is zero. If so, the memory management logic 420 uses the memory release logic 435 to unload the second software module 445 and/or release the memory allocated to the second software module 445.

The above referenced components, processor 410, memory management logic 420, switch table maintenance logic 425, memory allocation logic 430 and memory release logic 435, substantially provide an system for dynamically loading a module that may or may not be recognized by the operating system as being a dynamically loadable module. In addition, the components substantially provide a system for unloading modules and releasing memory allocated to the modules. The system permits a module that is not recognized as dynamically loadable to take advantages of features, such as the switch table, that are not otherwise be available to the module.

In an alternative embodiment, the system is embodied as computer readable code stored on a computer readable medium. The code may include one or more computer/processor executable instructions that cause the computer to act in a selected manner. The computer readable medium may be an optical storage device such as a CD-ROM or DVD-ROM, a magnetic storage device such as a hard disk or floppy disk, an electronic storage device such as a memory card, RAM, ROM, EPROM, EEPROM, or flash memory, or any other storage device capable of storing computer readable processor instructions.

The illustrated embodiments result in an architecture that supports DLKM's of any type through an association with a software module authorized to use a memory management function, such as a registration service. One of ordinary skill in the art will appreciate that there are multiple ways to achieve the architecture.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

I claim:

1. A method for reserving memory for a software module, comprising:
    allocating memory for a first software module;
    using a first loader to load the first software module into the allocated memory, the first software module having a second loader containing processor executable instructions for loading a second software module into the allocated memory;
    registering the first software module for service, thereby reserving the memory allocated to the first software module; and
    executing the processor executable instructions of the first software module; and
    loading the second software module into the allocated memory.

2. The method of claim 1, wherein registering the first software module includes incrementing a hold count, the hold count indicating whether the first software module should be maintained in memory.

3. The method of claim 1 further comprising dynamically loading the second software module.

4. A method for releasing memory reserved for a software module, comprising:
    executing processor executable instructions of a first software module having a first unloader for releasing a second software module from memory, the first software module residing in reserved memory;
    releasing the second software module; and
    unregistering the first software module for service using a second unloader, thereby releasing the memory reserved for the first software module.

5. The method of claim 4, wherein unregistering the first software module includes decrementing a hold count, the hold count indicating whether the memory reserved for the second software module can be safely released.

6. A software module, comprising:
    module registration logic,
    module unregistration logic, and
    logic to load a second software module,
    logic to unload the second software module, and
    logic to direct calls to the second software module; and
    creating a second software module containing logic for processing calls passed through the first software module.

7. The software module of claim 6, wherein the module registration logic includes an operating system call to external registration logic.

8. The software module of claim 6, wherein the module unregistration logic includes an operating system call to external unregistration logic.

9. A method for utilizing a registration service to dynamically load a software module regardless of the module type, comprising:
    using a first loader to load a first software module into a reserved memory, the first software module being of a module type authorized to utilize a registration service;
    executing the instructions of the first software module having a second loader to perform the steps of:
    loading a second software module,
    passing a request received by the first software module to the second software module for processing,
    receiving a result from the second software module,
    returning the result to a requesting process,
    unloading the second software module; and
    releasing the memory reserved for the first software module.

10. The method of claim 9, wherein the first software module comprises user programmed code.

11. The method of claim 9, wherein the second software module is of a module type that an operating system fails to recognize as being authorized to employ a registration service, and the operating system automatically utilizes the first software module to dynamically load the second software module.

12. A system for reserving memory for a software module, comprising:
    a processor;
    a memory connected to the processor for storing processor executable instructions to control the operation of said processor;

the processor executable instructions including:
instructions to register a first software module for service;
the first software module including instructions to allocate memory and load into the allocated memory a second software module associated with the first software module;
instructions to determine whether the first software module is needed for further processing;
instructions to unload the second software module from and release the allocated memory; and
instructions to unregister the first software module for service.

13. The system of claim 12, wherein the processor executable instructions further include:
instructions to allocate memory for a first software module;
instructions to load the first software module into the memory allocated for the first software module;
instructions to unload the first software module from the memory allocate for the first software module; and
instructions to release the memory allocated for the first software module.

14. The system of claim 12, wherein the processor executable instructions further include:
instructions to increment a hold count, the hold count indicating whether the first software module should be maintained in memory.

15. The system of claim 12, wherein the processor executable instructions further include:
instructions to call an operating system routine to update a switch table.

16. The system of claim 12, wherein the processor executable instructions further include:
instructions to dynamically load the second software module.

17. A system for managing memory, comprising:
a processor;
a memory connected to said processor storing:
a first software module;
a second software module associated with the first software module, wherein the first module includes instructions to load the second software module;
a switch table for storing a module hold count; and
processor executable instructions to control operation of the processor;
the processor executable instructions including:
instructions to register the first software module for service;
instructions to unregister the first software module for service; and
instructions to reserve and release memory for the second software module during execution of the first software module.

18. The system for managing memory of claim 17 wherein the processor executable instructions further comprise:
instructions to increment a hold count in the switch table, and
instructions to decrement a hold count in the switch table.

19. A computer-readable storage medium encoded with processing instructions for managing memory, including:
computer readable instructions that allocate memory for a first software module;
computer readable instructions that load the first software module into the allocated memory;
computer readable instructions that register the first software module for service; and
computer readable instructions that load a second software module associated with the first software module into the allocated memory.

20. A system for managing memory comprising:
a processor,
a memory,
a first loader for loading a first software module that is a dynamically loadable kernel module, a second software module that is associated with the first software module, wherein the first software module includes a second loader having instructions to load the second software module,
means for directing the processor to allocate memory for the first and second software modules, and
means for directing the processor to release the memory allocated for the first and second software modules.

21. The system for managing memory of claim 20, wherein the means for directing the processor to allocate memory for the first and second software modules comprises:
instructions to determine whether the first software module is dependent on the second software module,
instructions to allocate memory for the first software module,
instructions to load the first software module into the memory, and
instructions to allocate memory for the second software module if the first software module is dependent on the second software module.

22. The system for managing memory of claim 21, wherein the means for directing the processor to allocate memory for the first and second software modules further comprises:
instructions in the first software module to direct the processor to load the second software module into the memory.

23. The system for managing memory of claim 20, wherein the means for directing the processor to release the memory allocated for the first and second software modules comprises:
instructions to identify a number of dependent modules registered with the first software module,
instructions to unload the first software module from memory if the number of dependent modules registered with the first module equals zero,
instructions to unload the second software module from memory, and
instructions to release the memory allocated to the first and second software modules.

24. The system for managing memory of claim 23, wherein the number of dependent modules registered with the first software module is equal to a value of a hold count.

25. The system for managing memory of claim 24, wherein
the hold count is incremented when a dependent software module is registered, and
the hold count is decremented when a dependent software module is unregistered.

26. A system for managing memory comprising:
a first loader,
a first software module,
a second software module associated with the first software module,
memory, wherein the first software module includes a second loader having instructions for loading the second software module, means for releasing memory allocated to at least one of the first software module and the second software module.

27. The system for managing memory of claim 26, wherein the means for releasing memory allocated to the first software module comprises:
   decrementing the value of at least one of a hold count and a depend count for the first software module;
   unloading the first software module from memory if the hold count and the depend count are equal to zero,
   releasing memory allocated to the first software module if hold count and the depend count are equal to zero.

28. The system for managing memory of claim 26, wherein the means for releasing memory allocated to the second software module comprises:
   decrementing the value of at least one of a hold count and a depend count for the second software module;
   unloading the second software module from memory if the hold count and the depend count are equal to zero,
   releasing memory allocated to the second software module if hold count and the depend count are equal to zero.

29. A system for dynamically loading a second software module into memory comprising:
   a first loader,
   a first software module,
   a second software module associated with the first software module, wherein the first software module includes a second loader having instructions for loading the second software module, and
   means for the first software module to load the second software module into memory,
   wherein the second software module is not recognized as a dynamically loadable type software module.

30. The system for loading a second software module into memory of claim 29, wherein the means for the first software module to load the second software module into memory comprises:
   instructions to determine that the first software module depends on the second software module,
   instructions in the first software module to allocate memory for the second software module, and
   instructions to load the second software module into the allocated memory.

31. The system for loading a second software module into memory of claim 30, wherein the means for the first software module to load the second software module into memory further comprises:
   instructions to increment a depend count for the second software module,
   instructions to increment a hold count for the first software module,
   wherein the first software module is held in the memory as long as the hold count is greater than zero, and the second software module is held in memory as long as the depend count is greater than zero.

* * * * *